US009822679B2

United States Patent
Matsuda

(10) Patent No.: US 9,822,679 B2
(45) Date of Patent: Nov. 21, 2017

(54) BREATHER DEVICE FOR ENGINE

(71) Applicant: KAWASAKI JUKOGYO KABUSHIKI KAISHA, Kobe-shi, Hyogo (JP)

(72) Inventor: Yoshiharu Matsuda, Akashi (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 15/412,944

(22) Filed: Jan. 23, 2017

(65) Prior Publication Data
US 2017/0130624 A1  May 11, 2017

Related U.S. Application Data

(63) Continuation of application No. PCT/JP2014/083916, filed on Dec. 22, 2014.

(30) Foreign Application Priority Data

Jul. 29, 2014  (JP) .................................. 2014-153656
Jul. 29, 2014  (JP) .................................. 2014-153657

(51) Int. Cl.
*F01M 13/04* (2006.01)
*F02M 25/06* (2016.01)
(Continued)

(52) U.S. Cl.
CPC .......... *F01M 13/04* (2013.01); *B01D 46/0031* (2013.01); *F02M 25/06* (2013.01);
(Continued)

(58) Field of Classification Search
CPC ........... F01M 13/04; F01M 2013/0433; F01M 2013/0438; F01M 2013/0461; F01M 2013/0038; B01D 46/0031; F02M 25/06
See application file for complete search history.

(56) References Cited

U.S. PATENT DOCUMENTS 4,528,969 A * 7/1985 Senga .................... F01M 13/04
                                                            123/572
4,920,930 A   5/1990 Sakano et al.
(Continued)

FOREIGN PATENT DOCUMENTS

JP  39-025015  8/1964
JP  57-059913  4/1982
(Continued)

OTHER PUBLICATIONS

English Language Translation of the International Preliminary Report on Patentability, dated Feb. 9, 2017 for International PCT Patent Application No. PCT/JP2014/083916 (8 pages).
(Continued)

*Primary Examiner* — Jacob Amick

(57) ABSTRACT

A breather device for a combustion engine includes a breather chamber in which oil mist in the combustion engine is introduced, a breather passage that guides the oil mist to the breather chamber from a crank chamber, and a blowby gas passage that guides, to an air intake passage, blowby gas having been subjected to gas-liquid separation in the breather chamber. A separator is accommodated in a blowby drawing pipe forming the blowby gas passage. The oil mist is made into droplets by the separator so that the liquid component is collected in the breather chamber.

13 Claims, 8 Drawing Sheets

(51) Int. Cl.
  *B01D 46/00* (2006.01)
  *F01M 13/00* (2006.01)
(52) U.S. Cl.
  CPC .............. *F01M 2013/0038* (2013.01); *F01M 2013/0438* (2013.01)

(56) References Cited

U.S. PATENT DOCUMENTS

| | | | |
|---|---|---|---|
| 5,409,514 A * | 4/1995 | Ragusa .............. | B01D 39/2034 55/319 |
| 7,717,100 B2 | 5/2010 | Arima et al. | |
| 2007/0062500 A1 | 3/2007 | Arima et al. | |
| 2010/0319665 A1 * | 12/2010 | Li ........................... | F01M 1/04 123/573 |

FOREIGN PATENT DOCUMENTS

| | | |
|---|---|---|
| JP | 63-037452 | 10/1988 |
| JP | 03-042012 | 4/1991 |
| JP | 2007-077851 | 3/2007 |

OTHER PUBLICATIONS

International Search Report (dated Mar. 17, 2015) for PCT/JP2014/083916, filed on Dec. 22, 2014 (4 pages).

U.S. Appl. No. 14/754,428, filed Jun. 29, 2015 is a co-pending application (35 pages).

\* cited by examiner

BREATHER DEVICE FOR ENGINE

CROSS REFERENCE TO THE RELATED APPLICATION

This application is a continuation application, under 35 U.S.C. §111(a) of international patent application No. PCT/JP2014/083916, filed Dec. 22, 2014, which claims priority to Japanese patent applications No. 2014-153656 and No. 2014-153657, filed Jul. 29, 2014, the entire disclosure of which is herein incorporated by reference as a part of this application.

BACKGROUND OF THE INVENTION (Field of the Invention)

The present invention relates to a breather device for a combustion engine, the breather device including: a breather chamber into which oil mist including blowby gas in the combustion engine is introduced and in which gas-liquid separation is performed; and a breather passage which guides oil mist from a crank chamber to the breather chamber.

(Description of Related Art)

In a combustion engine mounted on a vehicle such as a motorcycle, for example, oil mist in the combustion engine is introduced into a breather chamber to be subjected to the gas-liquid separation therein. Blowby gas obtained through the gas-liquid separation performed in the breather chamber is returned into intake air for the combustion engine, and a liquid component is returned to an oil pan (for example, Patent Document 1).

RELATED DOCUMENT

Patent Document

[Patent Document 1] JP Laid-open Patent Publication No. 2007-077851

Such a combustion engine is demanded of improving the effect of the gas-liquid separation.

SUMMARY OF THE INVENTION

An object of the present invention is to provide a breather device for a combustion engine, which is capable of improving the effect of the gas-liquid separation.

In order to achieve the object, a breather device for a combustion engine according to the present invention includes: a breather chamber having formed therein a labyrinth structure in which oil mist in the combustion engine is introduced and the gas-liquid separation is performed; a breather passage configured to guide, into the breather chamber, oil mist from a crank chamber in which a crank shaft is disposed; a blowby gas passage configured to guide, to an air intake passage, blowby gas having been subjected to the gas-liquid separation in the breather chamber; and a separator accommodated in a tubular passage, formed between the breather passage and the blowby gas passage, the separator forming a shield structure having air permeability. The "shield structure having air permeability" refers to a structure in which a gas component of oil mist is passed and a liquid component of the oil mist is made into droplets to be attached.

According to the configuration, when oil mist flowing through the tubular passage passes through the separator, the gas component of the oil mist passes through the separator and the liquid component of the oil mist is made into droplets to be captured by the separator, so that the liquid component adheres to the separator. The liquid component so adhered is collected in the breather chamber due to its own weight, for example. This improves the gas-liquid separation effect of the breather device.

In the present invention, the tubular passage may be formed by a pipe body that is connected to an engine body of the combustion engine. According to this configuration, the pipe body can be connected to the engine body with the separator being accommodated in the pipe body. The formation of the pipe body and the separator as subunits facilitates the attachment of the separator.

In the present invention, the tubular passage may have an insertion opening in which the separator is inserted, and an accommodation part in which the separator is accommodated, and a retaining piece may be provided between the insertion opening and the accommodation part, to prevent the separator from coming out of the insertion opening. According to this configuration, movement of the separator due to passing of oil mist or the pressure difference can be avoided. The retaining piece is, for example, a circlip.

In a case where the retaining piece is provided, the tubular passage may further include a reduced-diameter portion at which an inner diameter is reduced, and the accommodation part may be located between the reduced-diameter portion and the insertion opening. According to this configuration, the provision of the reduced-diameter portion can prevent the separator, inserted into the pipe body from the insertion opening, from moving deeper inside the pipe body. As a result, positioning of the separator can be enabled by the retaining piece and the reduced-diameter portion.

In the present invention, a pipe member forming the breather passage or the blowby gas passage may include an elastic pipe part having elasticity and a metal pipe part to which the elastic pipe part is connected, and the separator may be accommodated in the metal pipe part. When the separator is accommodated in the elastic pipe part, the elastic pipe part and the separator come into contact with each other, and thus, the elastic pipe part may be degraded. According to this configuration, however, the accommodation of the separator in the metal pipe part can suppress the degradation of the elastic pipe part.

In the present invention, the tubular passage may extend in an up-down direction or in a vertical direction, and the crank chamber or the breather chamber may be disposed below the separator. According to this structure, the liquid component captured by the separator falls into the crank chamber or the breather chamber due to its own weight.

In the present invention, the separator may be a cylindrical body formed by entangled metal fibers. According to this configuration, the separator, which is made of a metal, is more durable than a separator made of a resin.

In the present invention, a pipe member forming the breather passage or the blowby gas passage may include: an elastic pipe part having elasticity; and a metal pipe part made of a metal material, in which case the metal pipe part may be formed in an L-shape having a first distal end portion to be press-fitted into an engine body of the combustion engine and a second distal end portion connected to the elastic pipe part, and an outer diameter surface on a side opposite to the first distal end portion at an L-shaped base of the metal pipe part in a press-fitting direction may be press-deformed to a flat surface perpendicular to the press-fitting direction. According to this structure, since the metal pipe part can be press-fitted into the engine body by pressing the flat surface, the metal pipe part is easily attached. Further, since the flat surface is press-molded, easy manufacturing and simple structure can be achieved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or equivalent parts throughout the several views, and:

DESCRIPTION OF EMBODIMENTS

Hereinafter, embodiments of the present invention will be described with reference to the drawings. The left and right directions used in the description in this specification refer to the left and right directions relative to a motorcycle rider maneuvering the motorcycle to travel forwards.

Figure 1:
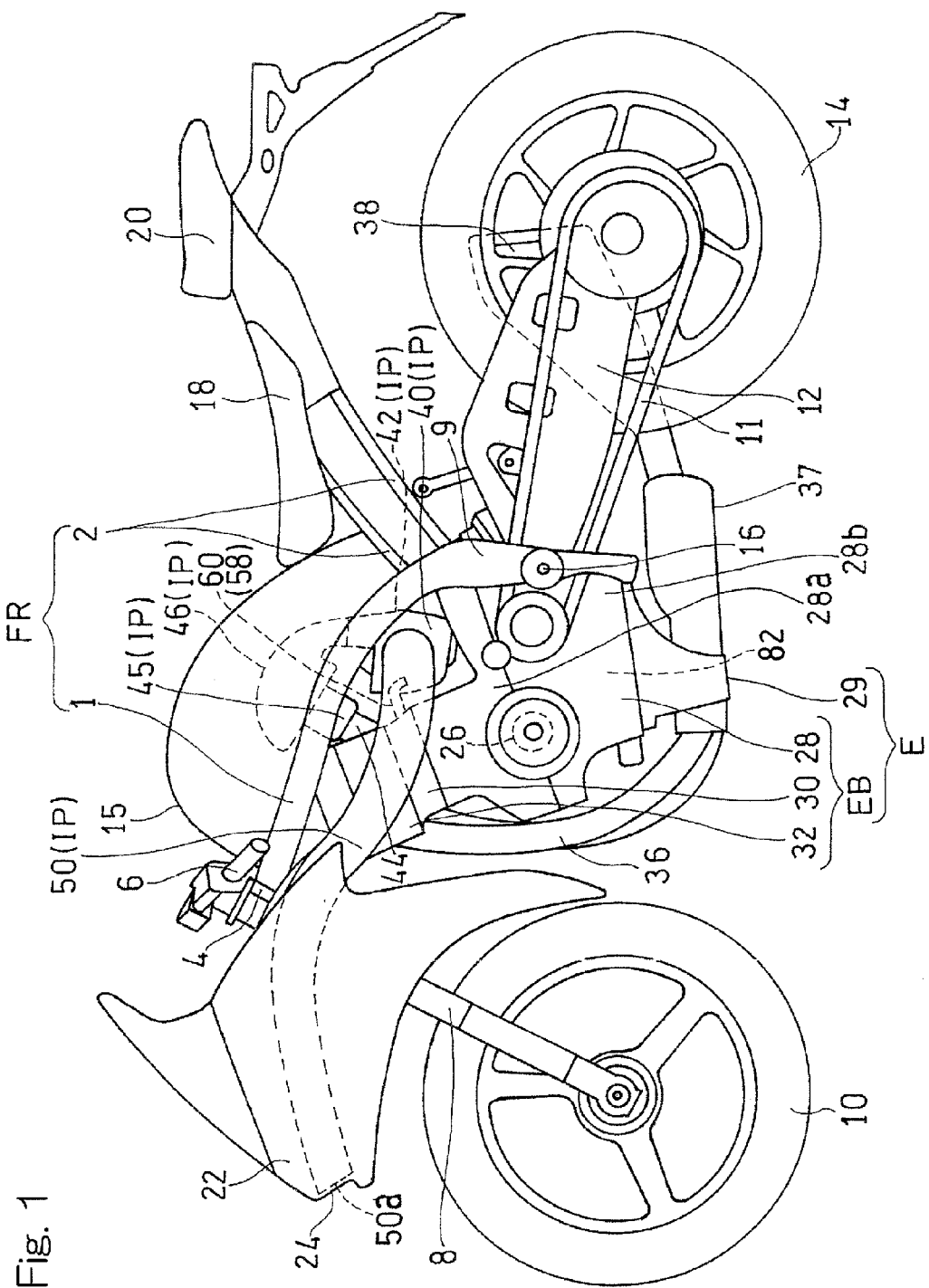
FIG. 1 is a side view showing a motorcycle equipped with a combustion engine that includes a breather device according to a first embodiment of the present invention.

FIG. 1 is a side view of a motorcycle equipped with a combustion engine including a breather device according to a first embodiment of the present invention. A motorcycle frame structure FR for the motorcycle includes a main frame 1 which forms a front half of the motorcycle frame structure FR, and a seat rail 2 which forms a rear half of the motorcycle frame structure FR. The seat rail 2 is mounted on a rear portion of the main frame 1. A head pipe 4 is provided at a front end of the main frame 1, and a front fork 8 is rotatably and pivotally supported by the head pipe 4 via a steering shaft (not shown). A front wheel 10 is fitted to a lower end portion of the front fork 8, and a steering handle 6 is fixed to an upper end portion of the front fork 8.

Meanwhile, a swingarm bracket 9 is provided at a rear end portion of the main frame 1 which is a lower intermediate portion of the motorcycle frame structure. FR. A swingarm 12 is pivotally supported for swing movement in an up-down direction or vertical direction about a pivot shaft 16 fitted to the swingarm bracket 9. A rear wheel 14 is rotatably supported by a rear end portion of the swingarm 12. A combustion engine E is fitted to the lower intermediate portion of the motorcycle frame structure FR at the front side of the swingarm bracket 9. This combustion engine E drives the rear wheel 14 via a drive chain 11. The combustion engine E is in the form of a parallel multi-cylinder water-cooled combustion engine having four cylinders with four cycles. It is, however, to be noted that the number of cylinders, the type of the combustion engine E or the like are not necessarily limited to those described above.

The combustion engine E includes a crank shaft 26 which has an axis extending in a right-left direction (motorcycle widthwise direction), a crank case 28 which supports the crank shaft 26, an oil pan 29 which is connected to a lower portion of the crank case 28, a cylinder block 30 which projects upward from an upper surface of the crank case 28, and a cylinder head 32 which is provided above the cylinder block 30. The crank case 28, the cylinder block 30, and the cylinder head 32 constitute an engine body EB.

The crank case 28 is structured to be separated into an upper case and a lower case, i.e., an upper crank case 28a on the upper side and a lower crank case 28b on the lower side. A crank chamber 82 in which the crank shaft 26 is disposed is formed in the crank case 28. The crank chamber 82 includes a gear chamber which accommodates a change gear train disposed rearward of the crank shaft 26.

Four exhaust pipes 36 are fluid connected to four exhaust ports in a front surface of the cylinder head 32, respectively. These four exhaust pipes 36 are merged together at a merging exhaust pipe 37 below the combustion engine E, and are then connected to a muffler 38 disposed on the right side of the rear wheel 14. A fuel tank 15 is disposed on an upper portion of the main frame 1 and a driver's seat 18 and a fellow passenger's seat 20 are supported by the seat rail 2. A cowling or fairing 22 made of a resin is mounted on a front portion of the motorcycle.

An air intake duct 50 is disposed on the left side of the motorcycle frame structure FR. The air intake duct 50 is supported by the head pipe 4 such that a front end opening 50a thereof faces an air inlet 24 of the cowling 22. The pressure of air introduced through the front end opening 50a of the air intake duct 50 is increased by a ram effect when the air flows in the air intake duct 50.

An air cleaner 40 which purifies outside air and a supercharger 42 are disposed side by side in the motorcycle widthwise direction, with the air cleaner 40 arranged outside, on an upper surface of a rear portion of the crank case 28 and rearward of the cylinder block 30. The air intake duct 50 extends from the front of the combustion engine E and passes the left outer side of the cylinder block 30 and the cylinder head 32, to guide incoming wind to the air cleaner 40 as intake air. The supercharger 42 is driven by the power of the combustion engine E, and pressurizes clean air, purified by the air cleaner 40, to supply it to the combustion engine E.

An intake air chamber 46 is disposed between the supercharger 42 and an intake port 44 of the combustion engine E, and the supercharger 42 and the intake air chamber 46 are directly connected to each other. The intake air chamber 46 reserves or stores high-pressure intake air supplied from the supercharger 42. A throttle body 45 is disposed between the intake air chamber 46 and the intake port 44. The air intake duct 50, the air cleaner 40, the supercharger 42, the intake air chamber 46, and the throttle body 45 cooperate together to form an air intake passage IP of the combustion engine E.

Figure 2:
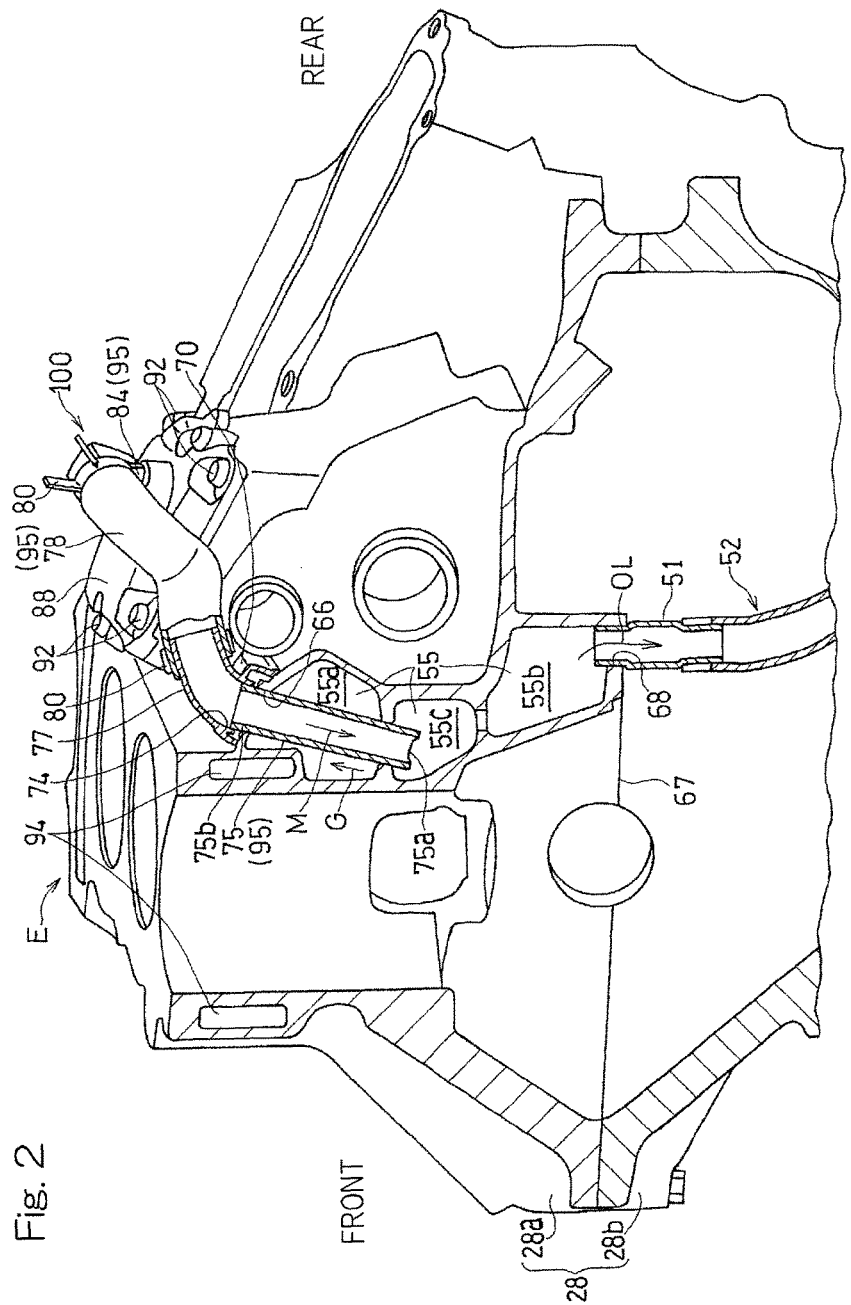
FIG. 2 is a longitudinal cross-sectional view showing a crank case of the combustion engine.

As shown in FIG. 2, a breather chamber 55 is formed at a rear portion inside the upper crank case 28a. Oil mist M in the combustion engine E is introduced to the breather chamber 55, and is then subjected to gas-liquid separation in the breather chamber 55. The breather chamber 55 is provided rearward of the cylinders, and is formed so as to be elongated in the vertical direction. Specifically, the breather chamber 55 extends from vicinity of an upper end portion of the upper crank case 28a to a lower end portion of the upper crank case 28a. However, the breather chamber 55 does not reach the lower crank case 28b. Therefore, a sealing member for sealing the breather chamber 55 can be omitted.

The breather chamber 55 has a labyrinth structure. Specifically, the breather chamber 55 has a plurality of segmented chambers arranged in the vertical direction, and the passages that allow the chambers to be communicated with one another are formed narrow. The breather chamber 55 of the present embodiment includes three chambers, namely, an uppermost chamber 55a, a lowermost chamber 55b, and an intermediate chamber 55c.

An upper opening 66 is formed in an upper portion of the breather chamber 55, and a lower opening 68 is formed in a lower portion of the breather chamber 55. The lower opening 68 serves to discharge the liquid component of oil mist M having been subjected to the gas-liquid separation in the breather chamber 55, and is open to a lower end surface 67 of the upper crank case 28a. A connection pipe 51 is fitted in the lower opening 68, and an oil return pipe 52 is connected to the connection pipe 51. The liquid component obtained through the gas-liquid separation performed in the breather chamber 55 is returned via the oil return pipe 52 to the oil pan 29 (FIG. 1).

Figure 3:
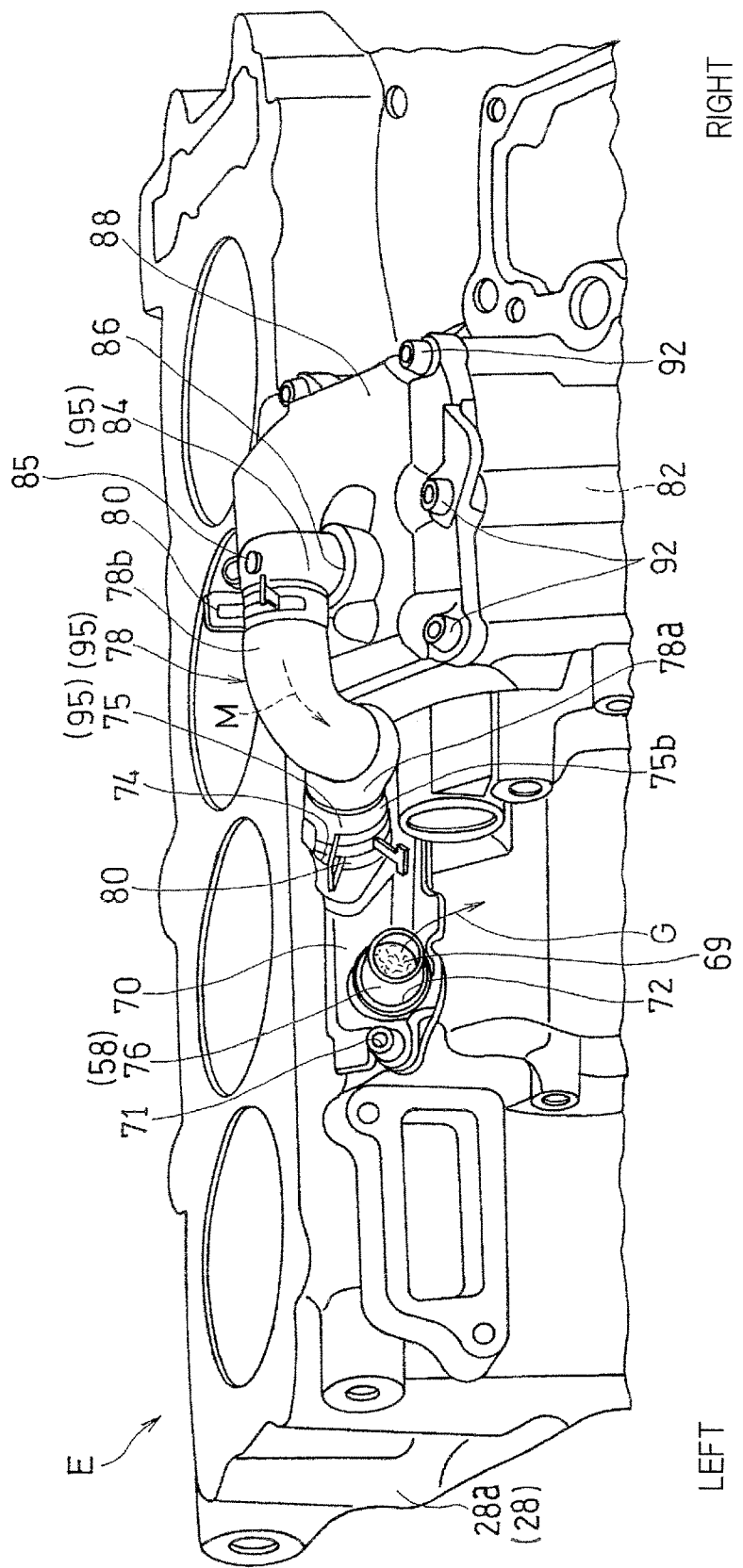
FIG. 3 is a perspective view of an upper portion of the crank case, obliquely viewed from rear and above.

An upper cover 70 shown in FIG. 3 is mounted to the upper crank case 28a so as to cover an area above the upper opening 66. The upper cover 70 is mounted to the crank case 28 by means of a plurality of bolts 71. First and second through-holes 72, 74 are formed in the upper cover 70 side by side in the right-left direction or motorcycle widthwise direction. The first and second through-holes 72, 74 allow the breather chamber 55 to be communicated with the outside.

A blowby drawing pipe 76 is mounted to the first through-hole 72 on the left side, and a discharge pipe 60 shown in FIG. 1, which forms a blowby gas passage 58, is connected to the blowby drawing pipe 76. The discharge pipe 60 is connected to the upstream side of the supercharger 42 in the air intake passage IP of the combustion engine E, specifically, to the air cleaner 40 in the present embodiment. Blowby gas G, which is the gas component obtained through the gas-liquid separation performed in the breather chamber 55 (FIG. 2), is returned via the discharge pipe 60 to the air intake passage IP. In the present embodiment, the blowby drawing pipe 76 is formed by a metal pipe, and the discharge pipe 60 is formed by a hose made of an elastic material such as rubber. The details of the blowby drawing pipe 76 will be given later.

A breather pipe 75 is mounted to the second through-hole 74 on the right side in FIG. 3. As shown in FIG. 2, the breather pipe 75 extends in a substantially vertical direction, and an outlet (lower end) 75a of the breather pipe 75 is disposed at a position distanced downwardly away from the upper opening 66 in the breather chamber 55. Specifically, the breather pipe 75 passes through the uppermost chamber 55a and is open to the intermediate chamber 55c.

An upper end portion 75b of the breather pipe 75 is fitted inside the root portion of a protruding pipe part 77 provided on the upper cover 70. One end portion 78a of a breather hose 78 is connected to an upper end portion of the protruding pipe part 77. The other end portion 78b of the breather hose 78 is connected to an introduction pipe 84 shown in FIG. 3. The breather hose 78 is made of an elastic material such as rubber, and the breather pipe 75 and the introduction pipe 84 are formed by metal pipes. The introduction pipe 84 is connected to an introduction hole 86 formed in an upper portion of the crank chamber 82. The protruding pipe part 77 and the introduction pipe 84 are connected to the breather hose 78 by means of a fixture 80 such as a band.

Figure 4:
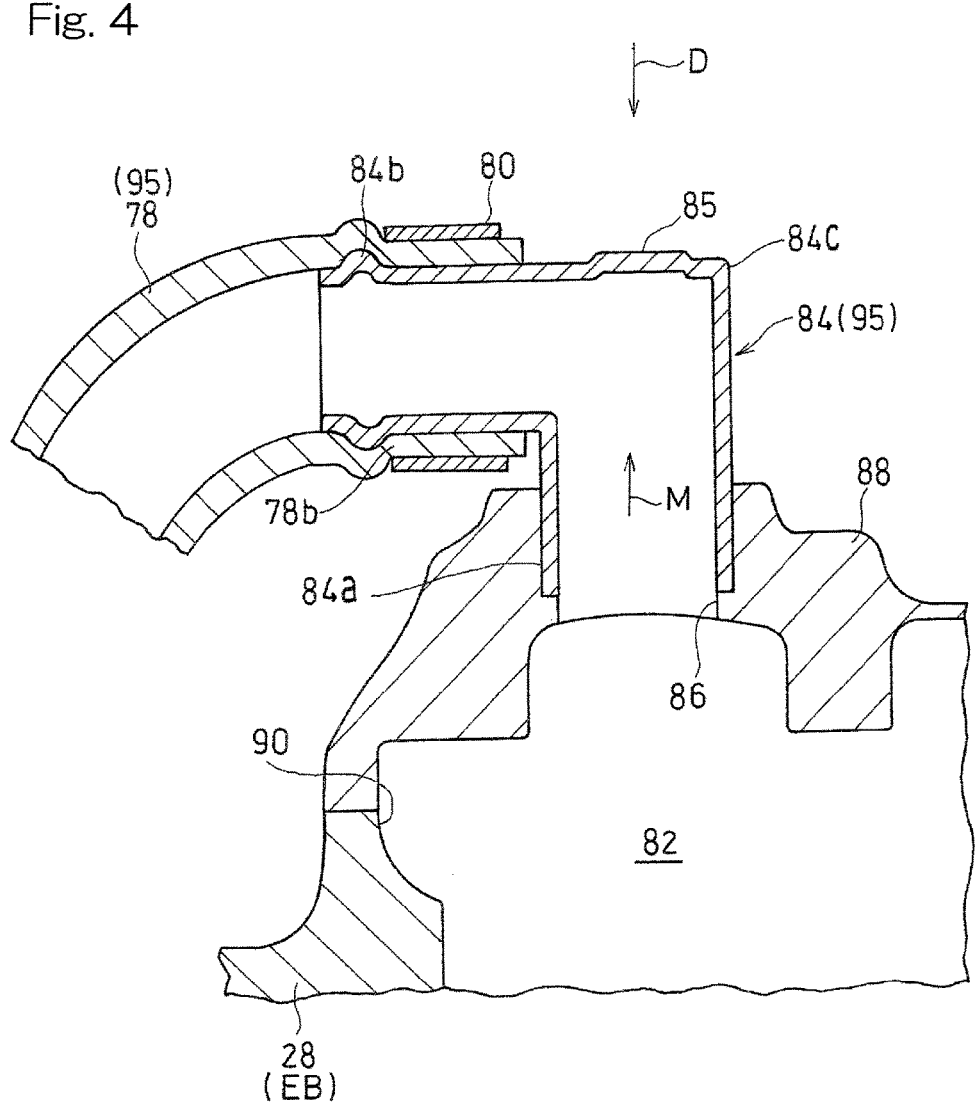
FIG. 4 is a longitudinal cross-sectional view of the upper portion of the crank case.

As shown in FIG. 4, the introduction pipe 84 is formed in an L-shape having a first distal end portion 84a and a second distal end portion 84b. The first distal end portion 84a is press-fitted into the introduction hole 86 of the engine body EB, and the second distal end portion 84b is connected to the other end portion 78b of the breather hose 78. A flat surface 85 perpendicular to a press-fitting direction D is formed on the outer diameter surface of an L-shaped base portion 84c of the introduction pipe 84, which outer diameter surface is located opposite, in the press-fitting direction D, to the first distal end portion 84a. The flat surface 85 is formed by press working from the inside.

Figure 7:
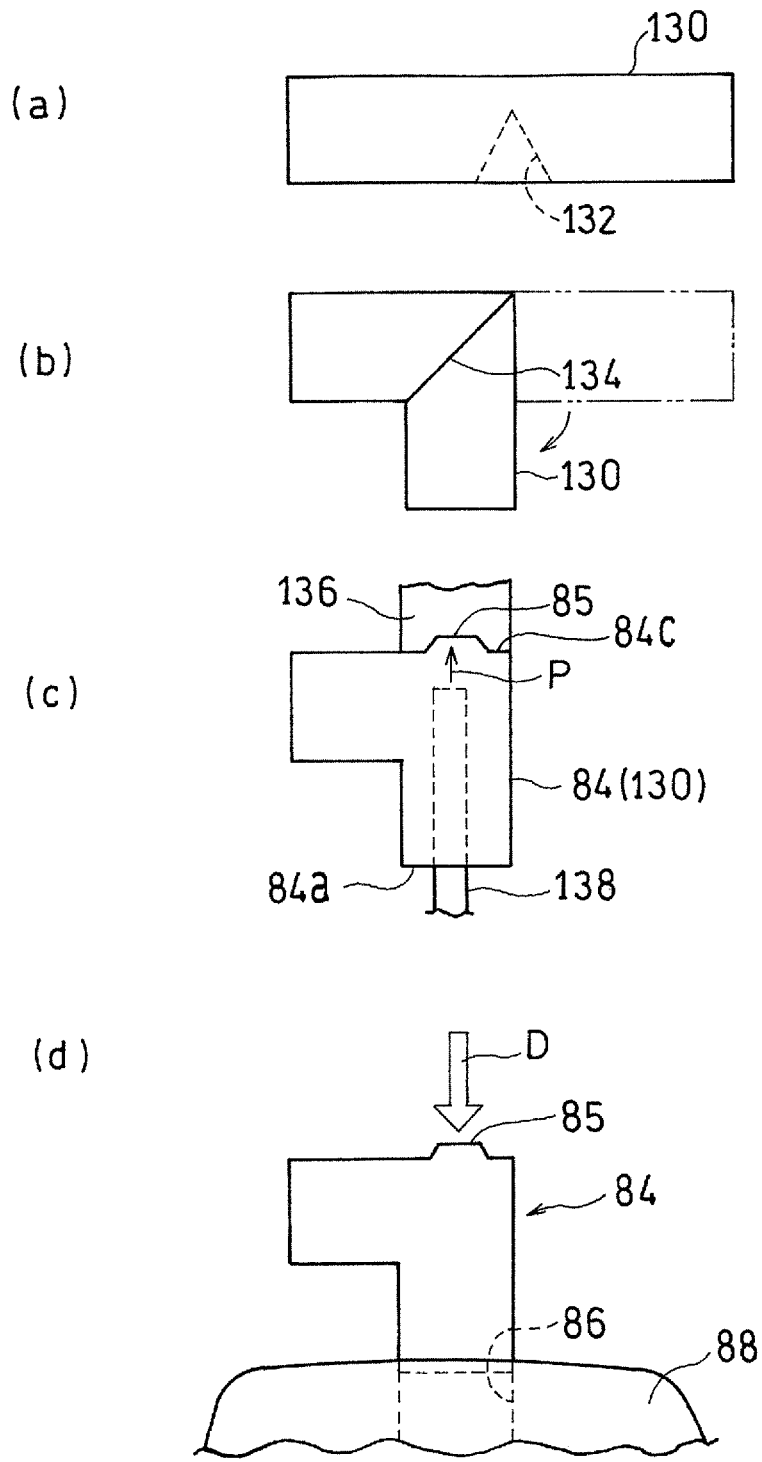
FIG. 7 is a flow chart illustrating processes of manufacturing an introduction pipe of the combustion engine.

Specifically, as shown in step (a) of FIG. 7, a V-shaped cut 132 is formed in the pipe member 130 such as an iron pipe to remove a cut-away part. Then, as shown in step (b) of FIG. 7, the pipe member 130 is bent along the cut 132, and a contact portion 134 is fixed by welding to form an L shape. Thereafter, as shown in step (c) of FIG. 7, a mold 136 is brought into contact with the outer diameter surface of the base 84c of the introduction pipe 84, and the inner diameter surface of the base 84c is pressed in the direction of an arrow P by a pin 138 that is inserted from the first distal end portion 84a, thereby forming the flat surface 85. As shown in step (d) of FIG. 7, press-fitting force is applied to the flat surface 85 in the press-fitting direction D so that the introduction pipe 84 is press-fitted into the introduction hole 86 of the engine body EB.

The introduction hole 86 shown in FIG. 3 is formed in an upper end portion of the crank case 28, at a position distanced rearward from the cylinder axes. Specifically, as shown in FIG. 4, a crank chamber opening 90 is formed in an upper portion of the crank chamber 82, and the crank chamber opening 90 is closed by a crank chamber cover 88. The crank chamber cover 88 is mounted to an upper surface of the crank case 28 by means of a plurality of bolts 92 (FIG. 3).

The introduction pipe 84 is disposed so as to project upward from the upper end portion of the crank case 28, and is connected to the breather hose 78 which passes outside of the combustion engine E. The introduction pipe 84, the breather hose 78 and the breather pipe 75, shown in FIG. 2, cooperate together to form a breather passage 95 that guides oil mist M from the crank chamber 82 to the breather chamber 55. Although these three members 84, 78 and 75 form the breather passage 95 in the present embodiment, a single member may form the breather passage 95. The breather chamber 55, the breather passage 95 and the blowby gas passage 58 cooperate together to form a breather device 100 for the combustion engine E.

The breather passage 95 is formed in a U shape protruding upward. Specifically, the introduction pipe 84 extends upward along the flow of the oil mist M, the breather hose 78 extends in the right-left direction, and the breather pipe 75 extends downward. Accordingly, it is possible to obtain the effect of the gas-liquid separation even in the breather passage 95.

The provision of the breather passage 95 outside the crank case 28 makes it possible to make the breather passage 95 long as compared with the case where the breather passage is formed inside the crank case 28, and, in addition, enables cooling of the gas flowing in the breather passage 95 by outside air. As a result, the effect of the gas-liquid separation in the breather passage 95 is improved. The breather chamber 55 is formed adjacent to a water jacket 94 of the upper crank case 28a on the air intake side (rear side) of the crank case 28. Accordingly, a temperature rise in the breather chamber 55 is suppressed, and therefore, the effect of the gas-liquid separation in the breather chamber 55 is improved.

Figure 6:
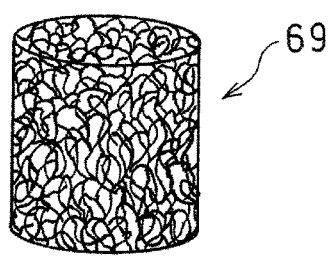
FIG. 6 is a perspective view showing the separator.

A separator 69 that promotes the gas-liquid separation of the oil mist M is mounted to the blowby drawing pipe 76 shown in FIG. 3. As shown in FIG. 6, the separator 69 is composed of a cylindrical body formed by entangled metal fibers, and is formed by entangling an aggregation of a single curved wire in the present embodiment. The separator 69 may be formed by entangling an aggregation of a plurality of curved wires. Instead of the metal fibers (wire), resin fibers, a porous resin material, a ceramic porous resin material or the like may be used.

The separator 69 has a shield structure having air permeability. Specifically, the separator 69 has a structure that shields the passage to reduce the flow velocity of the oil mist M that passes through the separator 69. The separator 69 also has a filter structure formed with a ventilation passage sufficiently smaller than the pipe diameter. The separator 69 should only have a structure in which the gas component of the oil mist M is passed and the liquid component of the oil mist M is formed into droplets to adhere to the separator 69. The ventilation passage of the separator 69 may have a linear shape or a non-linear shape, and the cross-sectional area of the ventilation passage may be larger or smaller than the outer shape of the oil mist particles.

Figure 5:
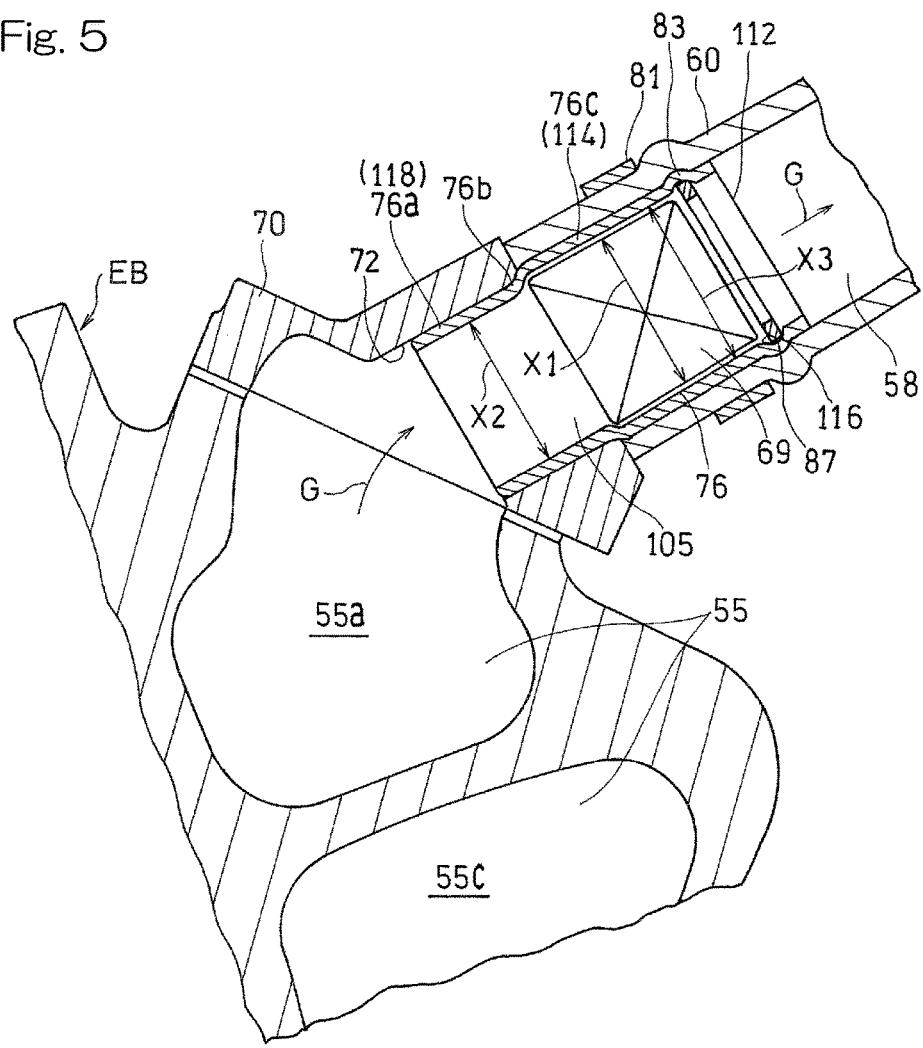
FIG. 5 is a cross-sectional view showing an accommodation part for a separator of the breather device.

Although the separator 69 in the present embodiment is inserted into the blowby gas passage 58 shown in FIG. 5, the separator 69 may be accommodated in a tubular passage 105 formed between the breather passage 95 and the blowby gas passage 58. The tubular passage 105 is formed by a pipe body or pipe member connected to the engine body EB, and the blowby drawing pipe 76 forms this pipe body in the present embodiment.

A proximal end part 76a of the blowby drawing pipe 76 is formed such that the outer diameter thereof is slightly larger than the inner diameter of the first through-hole 72. By so doing, the proximal end part 76a is press-fitted into the first through-hole 72 of the upper cover 70 so as to achieve interference fit. Furthermore, the blowby drawing pipe 76 has a body part 76c that is enlarged with a step part 76b from the proximal end part 76a. This step part 76b defines the press-fitting position of the blowby drawing pipe 76, and inhibits the body part 76c from entering inwardly from the first through-hole 72.

The blowby drawing pipe 76 has an insertion opening 112, in which the separator 69 is inserted, and an accommodation part 114 in which the separator 69 is accommodated. That is, the separator 69 is inserted through the insertion opening 112 to be accommodated in the accommodation part 114 formed in the body part 76c. A retaining piece 116 that prevents the separator 69 from coming out of the insertion opening 112 is provided between the insertion opening 112 and the accommodation part 114. In the present embodiment, the retaining piece 116 is formed by an annular circlip.

The inner diameter of the retaining piece 116, when fitted in a recess part 87 described later, is set smaller than the outer diameter of the separator 69. This restricts the movement of the separator 69 beyond the retaining piece 116 toward the blowby gas passage 58. In the present embodiment, the retaining piece 116 is formed in an annular shape and the inner diameter section of the retaining piece 116 is positioned radially inward of the outer shape of the separator 69 over the entire circumference in the circumferential direction. However, it is sufficient that the retaining piece 116 partly protrudes radially inward of the outer shape of the separator 69.

If the retaining piece 116 is provided detachably relative to the blowby drawing pipe 76 as in the present embodiment, the separator 69 can be attachably detached by removing the retaining pieces 116. This can facilitate cleaning and replacement of the separator 69, thereby improving the convenience of usage.

The blowby drawing pipe 76 further includes a reduced-diameter portion 118 that has a reduced inner diameter, and the accommodation part 114 is located between the reduced-diameter portion 118 and the insertion opening 112. In the present embodiment, the proximal end part 76a forms the reduced-diameter portion 118. The outer diameter X1 of the separator 69 is set larger than the inner diameter X2 of the reduced-diameter portion 118, and is set smaller than the inner diameter X3 of the accommodation part (body part) 114 (X2<X1<X3). This setting restricts the movement of the separator 69 toward the engine body EB. Therefore, the axial movement of the separator 69 is restricted by the retaining piece 116 and the reduced-diameter portion 118.

The discharge pipe 60 formed by an elastic hose is connected to the distal end of the blowby drawing pipe 76. The blowby drawing pipe 76 and the discharge pipe 60 are connected to each other by a fixture 81 such as a band. A protruding part 83 protruding radially outward is formed on the body part 76c of the blowby drawing pipe 76 to prevent the discharge pipe 60 from coming off the blowby drawing pipe 76. The blowby drawing pipe 76 and the discharge pipe 60 are clamped by the fixture 81 at a location closer to the engine body EB than the protruding part 83. This restricts the axial movement of the fixture 81.

The recess part 87, recessed radially outward, is formed at a portion of the inner surface of the blowby drawing pipe 76 that corresponds to the protruding part 83. The retaining piece 116 is fitted in the recess part 87. This restricts the axial movement of the retaining piece 116. In the present embodiment, the recess part 87 in which the retaining piece 116 is fitted is formed by utilizing the protruding part 83 provided to retain the discharge pipe 60. The formation of the protruding part 83 and the recess part 87 in one step facilitates the manufacturing work.

It is preferable that the axial dimension of the separator 69 is set equal to or less than the length from the protruding part 83 to the step part 76b, since the separator 69 can be easily disposed within the blowby drawing pipe 76. In particular, it is further preferable that the axial dimension of the separator 69 is set equal to the length from the protruding part 83 to the step part 76b, since the axial movement of the separator 69 can be restricted while the separator 69 is enlarged to enhance the effect of capturing the liquid component.

The blowby drawing pipe 76 extends obliquely upward toward the rear, and the breather chamber 55 is disposed below the separator 69. Therefore, the liquid component of the oil mist M adhered to the separator 69 flows down due to its own weight to be collected in the breather chamber 55.

The flows of blowby gas G and oil in the combustion engine E of the present embodiment will be described. When the combustion engine E shown in FIG. 1 is started, an air/fuel mixture leaks from gaps between pistons and cylinders, and the blowby gas leaks into the crank chamber 82. Meanwhile, oil having been supplied from the oil pan 29 and having lubricated and cooled portions of the combustion engine E is returned to the oil pan 29 below the crank chamber 82.

As shown in FIG. 4, the oil mist M including the blowby gas G is guided into the inside (breather passage 95) of the introduction pipe 84 above the crank chamber 82. The oil mist M having been guided into the introduction pipe 84 passes through the breather hose 78 and the breather pipe 75 shown in FIG. 2, to be introduced to the breather chamber 55.

The oil mist M having been introduced to the breather chamber 55 is subjected to gas-liquid separation in the breather chamber 55. The oil blowby gas G, which is the gas component of the mist M, moves to an upper portion of the breather chamber 55, and then is returned to the air intake passage IP of the combustion engine E (FIG. 1) via the discharge pipe 60, which is connected to the blowby drawing pipe 76 shown in FIG. 5.

When the blowby gas G passes through the blowby gas passage 58, the gas component thereof passes through the separator 69, and the liquid component thereof is made into droplets by the separator 69 to be attached to the separator 69. The droplet liquid component is collected through the blowby drawing pipe 76 into the breather chamber 55 located thereunder. A liquid component (Oil OL) having been made into droplets by the separator 69 and a liquid component (Oil OL) of oil mist M having been subjected to gas-liquid separation in the breather chamber 55 shown in FIG. 2, are returned through the oil return pipe 52 to the oil pan 29 shown in FIG. 1. Since the gas-liquid separation is performed in the separator 69 in addition to the gas-liquid separation in the breather chamber 55, the effect of the gas-liquid separation in the breather device 55 is improved.

The separator 69 is disposed at the downstream side of the breather chamber 55, i.e., in the blowby gas passage 58 through which the blowby gas G having been subjected to the gas-liquid separation in the breather chamber 55 passes. Therefore, even if the liquid component obtained as a result of the gas-liquid separation in the breather chamber 55 pops out toward the blowby gas passage 58 due to the pressure pulsation in the crank chamber 82, the liquid component is captured by the separator 69. This makes it possible to prevent the liquid component from flowing beyond the separator 69 into the blowby gas passage 58. Further, since the separator 69 increases the passage resistance, it is possible to inhibit the counter flow of the blowby gas G from the downstream side to the upstream side of the separator 69.

As shown in FIG. 5, the separator 69 is disposed in the blowby drawing pipe 76 connected to the engine body EB. This allows the blowby drawing pipe 76 to be connected to the engine body EB with the separator 69 accommodated in the blowby drawing pipe 76. The formation of the blowby drawing pipe 76 and the separator 69 as subunits in this manner facilitates attachment of the separator 69 to the engine body EB.

The retaining piece 116 is provided between the insertion opening 112 and the accommodation part 114 of the blowby drawing pipe 76. Accordingly, movement of the separator 69, which is caused by passing of the blowby gas G or the difference in pressure between the upstream and downstream sides of the separator 69, can be prevented.

The accommodation part 114 is defined between the insertion opening 112 and the reduced-diameter portion 118 of the blowby drawing pipe 76, and the separator 69 is disposed between the retaining piece 116 and the reduced-diameter portion 118. Accordingly, the separator 69 which is inserted through the insertion opening 112 in the blowby drawing pipe 76 can be prevented from moving in the axial direction of the blowby drawing pipe 76.

Moreover, the separator 69 is disposed in the blowby drawing pipe 76 which is a metal pipe part, and the retaining piece 116 is fitted in the recess part 87 formed in the blowby drawing pipe 76. The recess part 87 is formed at the same time as the protruding part 83 for preventing the discharge pipe 60, which is an elastic pipe part, from coming out. In this manner, it is possible to provide the retaining piece 116 easily by utilizing the protruding part 83 for preventing the discharge pipe 60 from coming out.

When the separator 69 is accommodated in the discharge pipe (elastic pipe part) 60, the discharge pipe 60 and the separator 69 come in contact with each other, and thus, the discharge pipe 60 may be deteriorated. However, the provision of the separator 69 in the blowby drawing pipe (metal pipe part) 76 can suppress the deterioration of the discharge pipe 60. It should however be noted that if the deterioration of the discharge pipe 60 which is caused by contact of the discharge pipe 60 with the separator 69 can be suppressed, the separator 69 may be accommodated in the discharge pipe 60 or an elastic pipe part.

Since the blowby drawing pipe 76 extends obliquely upward toward the rear from the breather chamber 55, the liquid component separated by the separator 69 falls into the breather chamber 55 due to its own weight.

As shown in FIG. 6, the separator 69 is composed of a cylindrical body formed by entangled metal fibers, and is thus more durable than that made of a resin. Further, the separator 69 is formed by entangling the aggregation of a single wire, and therefore, even if the entanglement becomes partly loose, the wire does not fall off.

As shown in FIG. 3, the outer diameter surface of the base 84*c* of the introduction pipe 84, which outer diameter surface is located opposite to the first distal end portion 84*a* in the press-fitting direction D, is press-molded to the flat surface 85 perpendicular to the press-fitting direction D. This makes it possible to press the flat surface 85 to press-fit the introduction pipe 84 into the engine body EB, thus facilitating attachment of the introduction pipe 84 to the engine body EB. In addition, since the flat surface 85 is formed by press working, the structure of the introduction pipe 84 is simple.

Figure 8:
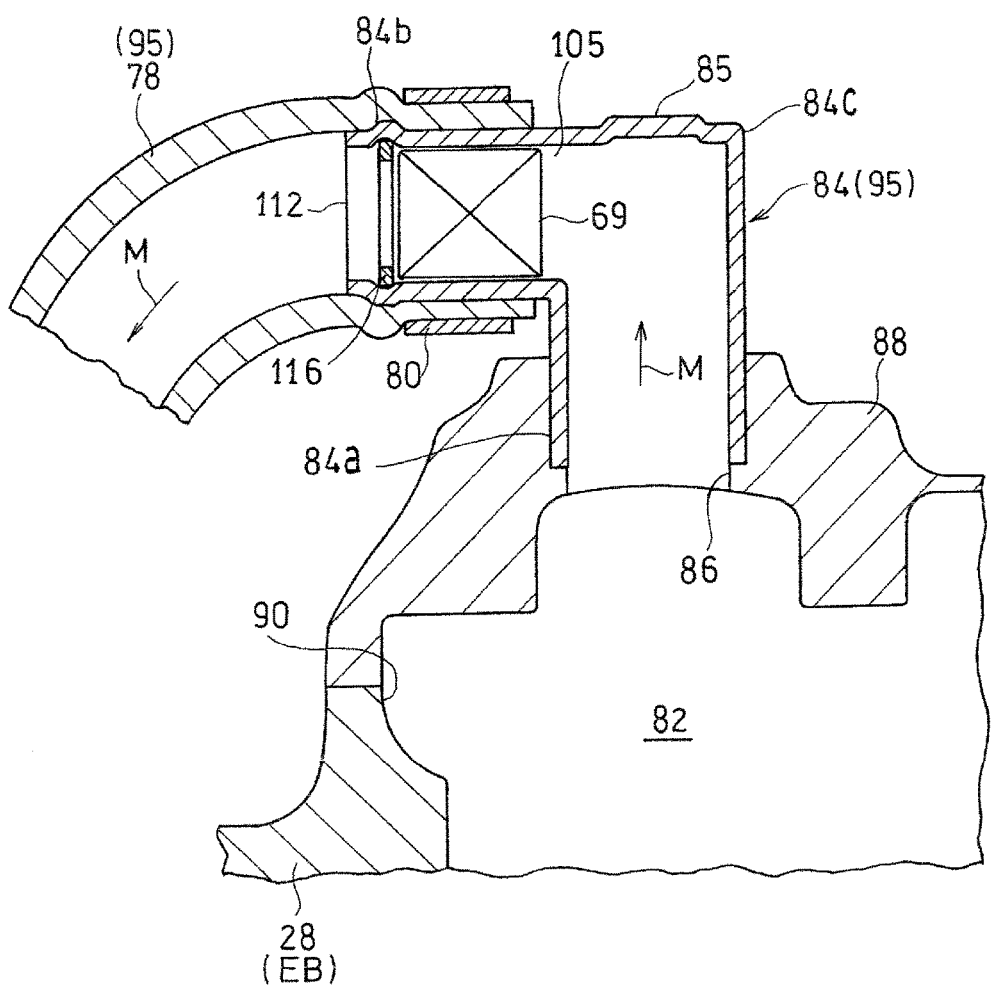
FIG. 8 is a cross-sectional view showing an accommodation part for a separator of a breather device according to a second embodiment of the present invention.

FIG. 8 shows an accommodation structure for the separator 69 in the breather apparatus 100 according to a second embodiment of the present invention. In the second embodiment, the separator 69 is disposed inside the introduction pipe 84 in the breather passage 95. That is, the introduction pipe 84 defines the pipe body that forms the tubular passage 105. In other words, the separator 69 is disposed in the metal pipe part (introduction pipe 84), not the elastic pipe part (breather hose 78) in the breather passage 95. In the second embodiment, the separator 69 may also be provided in the breather hose 78 which is an elastic pipe part.

Specifically, the separator 69 is disposed at the second distal end portion 84*b* of the introduction pipe 84. In other words, the opening of the second distal end portion 84*b* forms the insertion opening 112 in which the separator 69 is inserted. Moreover, the introduction pipe 84 is also provided with a retaining piece 116 similar to that in the first embodiment. The breather hose 78 which is connected to the second distal end portion 84b is inclined downward toward the breather chamber 55. Thus, the liquid component of the oil mist M which has been made into droplets by the separator 69 is collected in the breather chamber 55. The configuration other than the arrangement of the separator 69 is the same as that in the first embodiment. Therefore, the second embodiment also has an advantage similar to that of the first embodiment.

Figure 9:
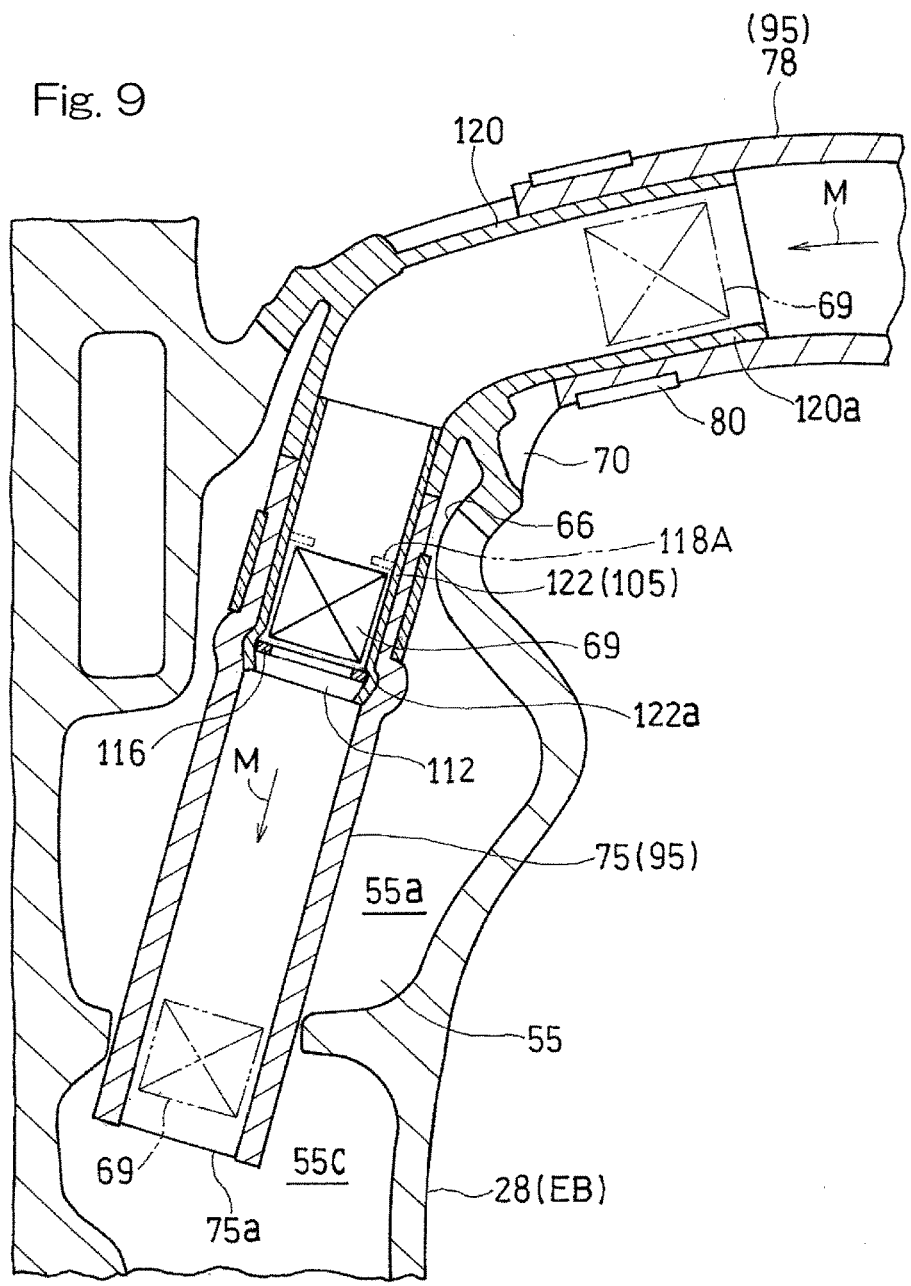
FIG. 9 is a cross-sectional view showing an accommodation part for a separator of a breather device according to a third embodiment of the present invention.

FIG. 9 shows an accommodation structure for the separator 69 in the breather apparatus 100 according to a third embodiment of the present invention. In the third embodiment, a hose connecting part 120 protruding upward is attached to the upper opening 66 of the breather chamber 55, and the breather hose 78 is connected to the hose connecting part 120. The breather pipe 75 is connected to a pipe connecting part 122 protruding downward from the upper opening 66. The hose connecting part 120 and the pipe connecting part 122 are formed by a metal pipe, and the breather pipe 75 is made of an elastic member such as rubber. The separator 69 as in the third embodiment is disposed inside the hose connecting part 120 of the breather passage 95. In other words, the hose connecting part 120 constitutes the pipe body that forms the tubular passage 105.

Similarly to the second embodiment, the separator 69 is disposed in the metal pipe part (pipe connecting part 122), not in the elastic pipe part (breather hose 78) in the breather passage 95. Specifically, the separator 69 is disposed at a lower end portion 122a of the pipe connecting part 122. In other words, the opening of the lower end portion 122a forms the insertion opening 112 in which the separator 69 is inserted. Further, though not shown, a retaining piece 116 similar to that in the first embodiment is also provided at the pipe connecting part 122. The liquid component of the oil mist M which has been made into droplets by the separators 69 falls through the breather pipe 75 from the pipe connecting part 122 to be collected in the breather chamber 55. In the third embodiment, the separator 69 may also be provided in the breather pipe 75 or an elastic pipe part.

The configuration other than the arrangement of the separator 69 is the same as those in the first and second embodiments. Therefore, the third embodiment also demonstrates an advantage similar to those of the first and second embodiments. Although the separator 69 is disposed in the pipe connecting part 122 in the third embodiment, the separator 69 may be disposed in an upper end portion 120a of the hose connecting part 120 in the breather passage 95, or inside the lower end portion (outlet) 75a of the breather pipe 75 as indicated by the double dotted line in FIG. 9. In this case, the hose connecting part 120 or the breather pipe 75 constitutes the pipe body that forms the tubular passage 105. In this case as well, the liquid component of the oil mist M which has been made into droplets by the separator 69 falls through the breather pipe 75 to be collected in the breather chamber 55.

In the second and third embodiments as well, the reduced-diameter portion may be provided in the pipe body on the side opposite to the retaining piece 116 so as to interpose therebetween the separator 69. The reduced-diameter portion may be formed by, for example, a protruding part 118A protruding radially inward from the inner circumferential surface of the pipe body as indicated by the double dotted line in FIG. 9. The protruding part 118A may be formed over the entire circumference in the circumferential direction, or a plurality of protruding parts 118A may be provided apart from one another in the circumferential direction.

In the second and third embodiments, the separator 69 is disposed in the breather passage 95 upstream of the breather chamber 55. Therefore, the passing speed (variation in pressure) of the oil mist M in the breather passage 95 is suppressed by the separator 69, and as a result, a variation in pressure in the breather chamber 55 can be suppressed. This can prevent the liquid component, having been subjected to the gas-liquid separation in the breather chamber 55, from being blown away into the blowby gas passage 58 on the downstream side.

The breather device 100 of the present invention is suitably used for a supercharged engine. Such an engine has a high pressure in the crank chamber, and thus demands greater gas-liquid separation. Although a single separator 69 is provided between the breather passage 95 and the blowby gas passage 58 in each of the first to third embodiments, the separators may be provided at two or more locations. Specifically, for example, in addition to providing one separator 69 (FIG. 5) as in the first embodiment in the blowby gas passage 58, another separator 69 (FIG. 8) as in the second embodiment may be provided in the breather passage 95. This further improves the effect of the gas-liquid separation of the oil mist M. In the case where the separators 69 are provided at multiple locations, the passage areas of the ventilation passages of the respective separators 69 may be set different from one another. In this case, it is preferable to set such that the passage area of the ventilation passage of a separator 69 disposed on the downstream side is smaller than the passage area disposed on the upstream side.

It is preferable that the pipe body in which the separator 69 is inserted has its axial center oriented in the vertical direction or tilted in the vertical direction with the separator 69 being mounted. In this case, the end portion of the separator 69 that is located on the breather chamber 55 side is preferably positioned lower, with the separator 69 being mounted. Accordingly, the liquid component captured by the separator 69 flows downward into the breather chamber 55 due to its own weight, thereby preventing the counter flow of the liquid component, captured by the separator 69.

Although the separator 69 is accommodated in the pipe body which is detachably attached to the engine body EB in the first to third embodiments, a tubular passage may be formed in the engine body EB, and the separator 69 may be disposed in such a tubular passage. Further, the lateral cross-section of the tubular passage 105 may have a circular shape, an elliptical shape or a polygonal shape equal to or greater than a triangular shape in terms of the number of sides.

The present invention is not limited to the above embodiments, and various additions, alterations or deletions may be made without departing from the gist of the present invention. For example, in the above embodiments, the breather device 100 of the present invention is adapted to the combustion engine for motorcycles, but may be adapted to engines of water crafts, vehicles other than the motorcycles, and the like, and may also be adapted to engines installed on the ground. Further, the breather apparatus 100 of the present invention may be adapted to engines other than a supercharged engine. Accordingly, such applications are to be construed as being included in the scope of the present invention.

REFERENCE NUMERALS

26 . . . crankshaft
55 . . . breather chamber

58 . . . blowby gas passage
60 . . . discharge pipe (elastic pipe part)
69 . . . separator (cylindrical body)
82 . . . crank chamber
95 . . . breather passage
100 . . . breather device
75 . . . breather pipe (pipe body)
76 . . . blowby drawing pipe (pipe body, metal pipe part)
78 . . . breather hose (elastic pipe part)
84 . . . introduction pipe (pipe body, metal pipe part)
85 . . . flat surface
105 . . . tubular passage
112 . . . insertion opening
114 . . . accommodation part
116 . . . retaining piece (circlip)
118 . . . reduced-diameter portion
120 . . . hose connecting part (pipe body)
122 . . . pipe connecting part (pipe body, metal pipe part)
E . . . combustion engine
EB . . . engine body
G . . . blowby gas
IP . . . air intake passage
M . . . oil mist

What is claimed is:

1. A breather device for a combustion engine comprising:
a breather chamber having formed therein a labyrinth structure in which oil mist in the combustion engine is introduced and gas-liquid separation is performed;
a breather passage configured to guide, into the breather chamber, the oil mist from a crank chamber in which a crank shaft is disposed;
a blowby gas passage configured to guide, to an air intake passage, blowby gas having been subjected to the gas-liquid separation in the breather chamber; and
a separator accommodated in a tubular passage, formed between the breather passage and the blowby gas passage, the separator forming a shield structure having air permeability; wherein
the tubular passage is formed by a pipe body that is detachably connected to an engine body of the combustion engine;
an elastic tube is connected to an outer periphery of the pipe of the pipe body; and
the separator is accommodated within the pipe body.

2. The breather device for a combustion engine as claimed in claim 1, wherein:
the tubular passage has an insertion opening in which the separator is inserted, and an accommodation part in which the separator is accommodated; and
a retaining piece is provided between the insertion opening and the accommodation part, to prevent the separator from coming out of the insertion opening.

3. The breather device for a combustion engine as claimed in claim 2, wherein:
the tubular passage further includes a reduced-diameter portion at which an inner diameter is reduced; and
the accommodation part is located between the reduced-diameter portion and the insertion opening.

4. The breather device for a combustion engine as claimed in claim 2, wherein the retaining piece is provided detachably relative to a pipe body forming the tubular passage.

5. The breather device for a combustion engine as claimed in claim 1, wherein
a pipe member forming the breather passage or the blowby gas passage includes an elastic pipe part having elasticity and a metal pipe part to which the elastic pipe part is connected, and
the separator is accommodated in the metal pipe part.

6. The breather device for a combustion engine as claimed in claim 5, wherein the separator is accommodated at a portion of the metal pipe part, which portion is enclosed by the elastic pipe part.

7. The breather device for a combustion engine as claimed in claim 6, wherein:
the metal pipe part and the elastic pipe part are connected with each other by clamping of a fixture; and
the separator is accommodated at a portion of the metal pipe part, which portion is clamped by the fixture.

8. The breather device for a combustion engine as claimed in claim 5, wherein:
the metal pipe part includes a protruding part configured to protrude radially outwardly from an outer periphery thereof and configured to prevent the elastic pipe part from coming off the metal pipe part;
a recess part, recessed radially outward, is formed at a portion of an inner surface of the metal pipe part, which portion corresponds to the protruding part; and
an annular retaining piece configured to restrict movement of the separator is fitted in the recess part.

9. A breather device for a combustion engine comprising:
a breather chamber having formed therein a labyrinth structure in which oil mist in the combustion engine is introduced and gas-liquid separation is performed;
a breather passage configured to guide, into the breather chamber, the oil mist from a crank chamber in which a crank shaft is disposed;
a blowby gas passage configured to guide, to an air intake passage, blowby gas having been subjected to the gas-liquid separation in the breather chamber;
a separator accommodated in a tubular passage, formed between the breather passage and the blowby gas passage, the separator forming a shield structure having air permeability; and
a pipe member forming the breather passage or the blowby gas passage and including an elastic pipe part having elasticity and a metal pipe part to which the elastic pipe part is connected; wherein:
the separator is accommodated in the metal pipe part;
the metal pipe part includes a proximal end part connected to an engine body of the combustion engine and a body part enlarged with a step part from the proximal end part, the body part being exposed from the engine body;
the separator is accommodated in the body part; and
an outer diameter of the separator is set larger than an inner diameter of the proximal end part and smaller than an inner diameter of the body part.

10. The breather device for a combustion engine as claimed in claim 1, wherein:
the tubular passage extends in a vertical direction; and
the crank chamber or the breather chamber is disposed below the separator.

11. The breather device for a combustion engine as claimed in claim 1, wherein the separator comprises a cylindrical body formed by entangled metal fibers.

12. A breather device for a combustion engine comprising:
a breather chamber having formed therein a labyrinth structure in which oil mist in the combustion engine is introduced and gas-liquid separation is performed;
a breather passage configured to guide, into the breather chamber, the oil mist from a crank chamber in which a crank shaft is disposed;

a blowby gas passage configured to guide, to an air intake passage, blowby gas having been subjected to the gas-liquid separation in the breather chamber;

a separator accommodated in a tubular passage, formed between the breather passage and the blowby gas passage, the separator forming a shield structure having air permeability; and a pipe member forming the breather passage or the blowby gas passage and including an elastic pipe part having elasticity and a metal pipe part made of a metal material; wherein:

the metal pipe part is formed in an L-shape having a first distal end portion to be press-fitted into an engine body of the combustion engine and a second distal end portion connected to the elastic pipe part; and an outer diameter surface on a side opposite to the first distal end portion at an L-shaped base of the metal pipe part in a press-fitting direction is press-deformed to a flat surface perpendicular to the press-fitting direction.

13. The breather device for a combustion engine as claimed in claim 1, wherein a pipe member forming the breather passage or the blowby gas passage includes an elastic pipe part having elasticity and a metal pipe part to which the elastic pipe part is connected;

the metal pipe part and the elastic pipe part are connected with each other by clamping of a fixture;

the separator is accommodated at a portion of the metal pipe part, which portion is clamped by the fixture;

the metal pipe part includes a protruding part configured to protrude radially outwardly from an outer periphery thereof and configured to prevent the elastic pipe part from coming off the metal pipe part and to prevent movement of the fixture; and a recess part, recessed radially outward, is formed at a portion of an inner surface of the metal pipe part, which portion corresponds to the protruding part; and an annular retaining piece configured to restrict movement of the separator is fitted in the recess part.

\* \* \* \* \*